United States Patent

Sogo et al.

[11] 4,149,861
[45] Apr. 17, 1979

[54] CYCLONE SEPARATOR

[75] Inventors: Yukio Sogo, Kawasaki; Kazuo Ido, Gunma; Kozo Taneda, Kodaira, all of Japan

[73] Assignee: Snow Brand Milk Products Co., Ltd., Hokkaido, Japan

[21] Appl. No.: 779,508

[22] Filed: Mar. 21, 1977

Related U.S. Application Data

[63] Continuation of Ser. No. 627,337, Oct. 30, 1975, abandoned.

[30] Foreign Application Priority Data

Oct. 31, 1974 [JP] Japan ............................... 49/132728

[51] Int. Cl.² .......................................... B01D 45/12
[52] U.S. Cl. ......................................... 55/261; 55/414; 55/426; 55/430; 55/459 R; 209/144; 210/512 R
[58] Field of Search ................. 55/392, 396, 414, 426, 55/430, 431, 432, 459 R, 459 A, 459 B, 459 C, 459, 261; 209/144; 222/161; 302/59; 210/512 R

[56] References Cited

U.S. PATENT DOCUMENTS

| | | | |
|---|---|---|---|
| 2,010,231 | 8/1935 | Heist | 55/426 |
| 2,039,115 | 4/1936 | Reif | 55/426 |
| 2,607,438 | 8/1952 | Bailey | 55/468 |
| 3,061,098 | 10/1962 | Brezinski | 209/144 |
| 3,150,943 | 9/1964 | Darrow et al. | 55/261 |
| 3,178,068 | 8/1965 | Dumbaugh | 222/161 |
| 3,199,269 | 8/1965 | Oehlrich et al. | 55/414 |
| 3,254,478 | 6/1966 | Szego | 55/459 D |
| 3,261,508 | 7/1966 | Wahl | 222/161 |
| 3,822,533 | 7/1974 | Orange | 55/426 |

OTHER PUBLICATIONS

Bin Vibrators, Eriezmagnetics, Erie, Pa., 16512, U.S.A., 9, 1972.

*Primary Examiner*—Frank W. Lutter
*Assistant Examiner*—David L. Lacey

[57] ABSTRACT

A cyclone separator comprising a separating tower defining a separating chamber having a gas inlet at the upper portion for introducing gaseous fluid having particles suspended therein with a tangential velocity component, and outlet pipe means co-axially with the separating chamber at the upper portion thereof to allow the gaseous fluid to flow out of the separating chamber. The separating tower has a bottom which is slightly inclined with respect to a horizontal plane to provide a lowermost portion in the bottom, and a particle outlet port at said lowermost portion. A vibrating motor applies vibration at least to said bottom of the separating tower, and a baffle plate is provided in said separating chamber above and spaced from said particle outlet port.

6 Claims, 5 Drawing Figures

CYCLONE SEPARATOR

This is a continuation of application Ser. No. 627,337 filed Oct. 30, 1975, now abandoned.

The present invention relates to cyclone separators for separating solid particles from gaseous carrying medium.

Conventional cyclone separators generally include a separating tower in which solid carrying gas is introduced from an upper portion thereof tangentially and downwardly to form a spiral downward flow substantially along the inner wall surface of the separating tower. The spiral flow of gas is turned in its direction of flow in the vicinity of the bottom of the separating tower and is caused to flow spirally upwardly substantially along the vertical center portion thereof. Solid particles are separated from the spiral flow of gas under the influence of centrifugal force and accummulate at the bottom portion of the tower until they are taken out. Thus, the spiral upward flow of gas along the vertical center portion of the separating tower contains less amount of solid particles. Therefore, the separating tower is provided at its upper portion with an outlet pipe disposed substantially coaxially with the tower so as to allow only the spiral upward flow to flow out of the tower. The outlet pipe is generally extended downwardly from the upper end of the separating tower for a certain distance in order that particle containing incoming flow is not allowed to enter the outlet pipe.

It has been found, however, that a boundary layer is formed along the outer surface of the portion of the outlet pipe extending into the separating tower to cause a substantial decrease in the speed of gas flow. Thus, the particles in the vicinity of the outer surface of the outlet pipe are not entrained in the spiral downward flow of the incoming gas but are allowed to fall downwardly apart from the spiral downward flow and are blown up by the spiral upward flow into the outlet pipe adversely increasing the particle content in the outlet gas.

In order to overcome the problem, the applicants have already proposed in Japanese Utility Model Application Sho No. 49-96254 that the outlet pipe of a cyclone separator be constituted of a plurality of co-axial outlet pipe elements and that means be provided for producing spiral downward flow in the annular space between each two adjacent outlet pipe elements. The arrangement also includes means for introducing accelerating air at the inlet portion of the separating tower so as to eliminate or substantially reduce the adverse effect of the boundary layer along the outer surface of the outlet pipe.

The proposed arrangement has been found satisfactory in providing highly efficient particle separation. However, it still has a disadvantage in that the separating tower must be of substantial vertical length.

It is therefore an object of the present invention to provide cyclone separators in which the vertical dimension can be substantially decreased while providing adequately high particle separating efficiency.

Another object of the present invention is to provide means for effectively taking out particles which accummulate in the bottom part of the separating tower.

A further object of the present invention is to provide cyclone separators which are small in vertical dimension and less expensive to manufacture.

According to the present invention, the above and other objects can be accomplished in cyclone separators having a separating tower by providing means associated with the lower portion of the separating tower for causing vibration thereof so that particles separated from the gas flow and having fallen on the bottom portion of the separating tower are discharged from the tower with the aid of the vibration. According to one feature of the present invention, the height of the separating tower can be substantially decreased and it becomes possible to omit the lower particle hopper which has conventionally been required.

According to another feature of the present invention, a baffle plate may be disposed above the lower portion of the separating tower so as to prevent particles which have accummulated on the lower portion of the tower from being entrained in and carried by the upwardly directed gas flow. This provides further improved efficiency of particle separation.

The above and other objects and features of the present invention will become apparent from the following description of a preferred embodiment made in reference to the accompanying drawings, in which.

Figure 1:
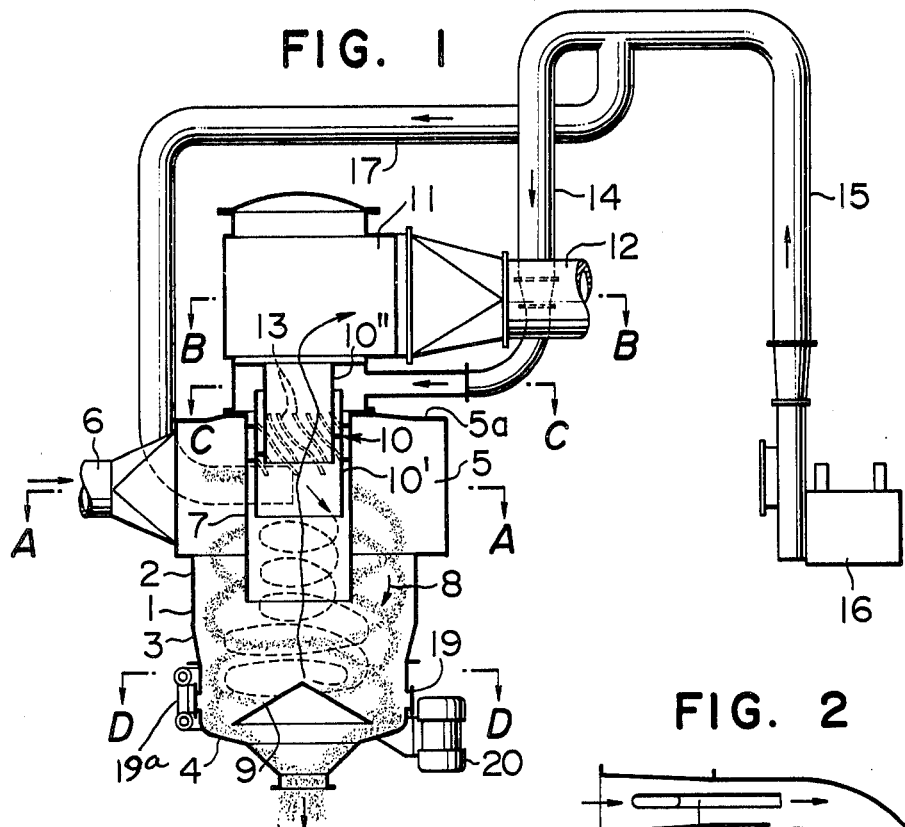
FIG. 1 is a vertical sectional view of a cyclone separator in accordance with one embodiment of the present invention.
Figure 2:
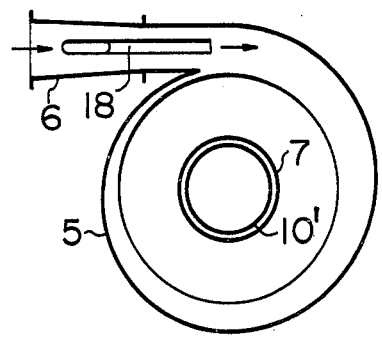
FIG. 2 is a sectional view taken substantially along the line A—A in FIG. 1.

Referring now to the drawings, particularly to FIG. 1, there is shown a cyclone separator which includes a separating tower 1 of substantially inverted frustoconical configuration having an upper cylindrical portion 2 and an intermediate conical portion 3. A lower conical portion 4 is secured to the intermediate conical portion 3 by means of a flexible band 19 and hinge construction 19a which support portion 4 on portion 3 while permitting lateral movement therebetween. A vibrating means including a vibrating motor 20 and a spring means is connected to the lower conical portion 4. The intermediate portion 3 of the separating tower 1 need not necessarily be of conical shape, but may be of cylindrical shape having the same diameter as that of the upper cylindrical portion 2. At the upper end of the separating tower 1, there is provided an inlet chamber 5 which has an inlet passage 6 disposed tangentially thereof as shown in FIG. 2. At the center of the inlet chamber 5, there is disposed a cylindrical outlet pipe 7 which extends from the upper wall 5a of the inlet chamber 5 downwardly to the upper cylindrical portion 2 of the separating tower 1.

Figure 3:
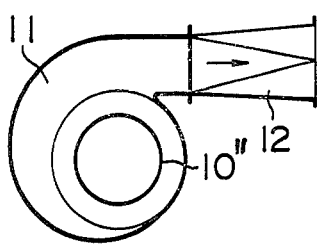
FIG. 3 is a sectional view taken substantially along the line B—B in FIG. 1.
Figure 4:
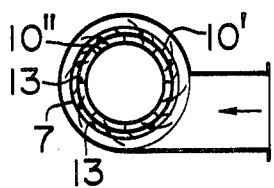
FIG. 4 is a sectional view taken substantially along the line C—C in FIG. 1.

A subsidiary outlet pipe assembly 10 is disposed in the outlet pipe 7 with a small radial spacing therebetween. The subsidiary outlet pipe assembly 10 includes a plurality of co-axially arranged cylindrical pipes 10' and 10". The innermost pipe 10" is in communication at its upper end with an outlet chamber 11 which is in turn connected with an outlet duct 12 (refer to FIG. 3). In the annular spaces between the pipes 7 and 10' and the pipes 10' and 10", there are disposed a plurality of spiral guide vanes 13 (refer to FIG. 4), and a blower 16 is provided so as to supply air into the spaces through ducts 15 and 14.

Further, the duct 15 from the blower 16 is also connected with a duct 17 which has an outlet nozzle 18 opening into the inlet passage 6 of the inlet chamber 5 (refer to FIG. 2). Thus, the air supplied from the blower 16 through the ducts 15 and 17 is discharged through the nozzle 18 toward the inlet chamber 5 to accelerate the inlet air flow. In addition, a substantially frustoconical baffle plate 9 is disposed directly below the outlet pipe in the separating tower 1 and apart from the exhaust port of the lower conical portion 4 to cover said exhaust port (refer to FIGS. 1 and 5).

Next, the operation of the cyclone separator will be explained. As well known in the art of cyclone separators, particle containing gas is introduced from the inlet passage 6 tangentially into the inlet chamber 5 and directed spirally downwardly along the inner wall surface of the separating tower 1 as shown by arrows 8 in FIG. 1. At the lower portion of the separating tower 1, the flow of gas is turned upwardly to form a spiral upward flow along the center portion of the separating tower 1. At the upper portion of the separating tower 1, the spiral upward flow is introduced into the outlet pipe 7. During this process, the solid particles in the gas are separated from the gas stream under the influence of centrifugal force and collected in the lower conical portion 4.

In the operation mentioned above, since the nozzle 18 is provided in the passage 6 to accelerate the inlet particle containing air flow, no substantial low speed boundary layer is formed on the outer surface of the outlet pipe 7, and therefore, the number of solid particles carried by the boundary layer becomes substantially zero. Thus, almost all of the solid particles in the inlet gas are downwardly carried by the accelerated spiral downward flow while being subjected to a large centrifugal force, whereby they are caused to spirally drop along the inner surface of the separating tower 1. Therefore, the inverted upward flow formed at the center portion of the separating tower 1 contains almost no solid particles.

However, the inverted upward gas flow introduced from the separating tower 1 into the outlet pipe 7 may contain a slight amount of fine solid particles which have not been centrifugally separated from the spiral gas flow in the separating tower 1. Such fine particles normally flow upwardly substantially along the inner surface of the outlet pipe 7. According to the present invention, the air supplied from the blower 16 through the ducts 15 and 14 is caused to form a spiral flow by the guide vanes 13 and flows downwardly through the spaces between the pipes 7 and 10 and the pipes 10' and 10" and along the inner wall surface of the pipe 7. The spiral downward flow of air along the inner surface of the pipe 7 serves to blow down the fine particles coming up along the inner surface and return them to the separating tower 1. In order to enhance the effect of blowing down the particles, the subsidiary outlet pipe assembly 10 is so made that the length of the innermost pipe 10" is shorter than that of the outer pipe 10' as shown in FIG. 1 so that the port formed by the area between the innermost pipe 10" and the outer pipe 10' is higher than that formed between the outer pipe 10' and the outlet pipe 7 which is defined as the outer annular space. Since the particle concentration in the outlet pipe 7 is highest at the area along the inner surface thereof, a substantial part of the fine particles accompanying the outlet gas is thus blown downwardly and returned to the separating tower 1 by the downward flow injected from the outer annular space between the outlet pipes 7 and 10'. Fine particles still contained in the outlet gas are mostly concentrated in the area along the inner surface of the outlet pipe 10' and those particles are blown downwardly by the spiral downward flow in the space between the pipes 10' and 10". Accordingly, the air fed into the outlet chamber 11 contains substantially no solid particles. It should be noted that, by increasing the number of the outlet pipes in the auxiliary outlet pipe assembly, the fine particles carried by the outlet gas could be substantially completely captured. A flow resistance device may be provided between the pipes 7 and 10' so that the speed of the spiral downward air flow is higher in the inner annular space than in the outer space, so as to enhance the effect of the present invention.

The solid particles separated from the air by the separating operation mentioned above drop down onto the lower conical portion 4. The conventional cyclone separator has a lower portion having an inclined surface close to a vertical surface. But, the lower conical portion 4 of the cyclone separator according to this invention has an inclined surface having a large angle to the vertical plane. Therefore, the solid particles which have dropped down onto the inclined surface of the lower portion 4 do not easily slide downwardly under only their own weight. Therefore, according to the present invention, the lower conical portion 4 is vibrated by the vibrating motor 20 as mentioned hereinbefore, so as to cause the solid particles on the lower portion 4 to slide and drop downwardly. The solid particles caused to slide down onto the lower conical portion 4 are concentrated toward the center portion thereof and exhausted from the exhaust port. The flexible band 19 prevents the vibration of the lower conical portion 4 from being propagated to the separating tower 1. By providing such vibrating means, it is possible to make the length of the intermediate and lower conical portions 3 and 4 extremely short and therefore, the size of the cyclone separator becomes very small.

Figure 5:
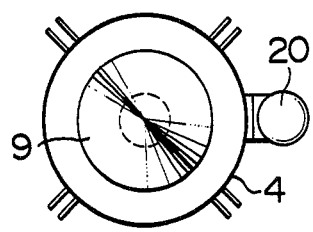
FIG. 5 is a sectional view taken substantially along the line D—D in FIG. 1.

Because of the lower conical portion 4 of the shortened length, there is a possibility of the particles which have fallen on the lower portion 4 being blown up by the inverted upward flow. In order to prevent such phenomenon, the baffle plate 9 of a substantially conical shape is provided apart from and to cover the lower conical portion 4, as shown in FIGS. 1 and 5, so as to screen the fallen particles from the upward spiral flow. By the provision of the baffle plate 9, the blowing up of the particles by the upward spiral flow is perfectly prevented.

As seen from the above, the provision of a lower conical portion having a vibrating means in a cyclone separator having an accelerating air blowing port and a subsidiary outlet pipe assembly, makes unnecessary the vertically long particle collecting cylinder and the hopper provided thereunder which are required in the conventional cyclone separators. Therefore, a cyclone separator of very small size and of low cost can be obtained.

The invention has thus been shown and described with reference to a specific embodiment, however, it should be noted that the invention is in no way limited to the details of the illustrated structures but changes and modifications may be made without departing from the scope of the appended claims.

We claim:

1. A cyclone separator comprising a separating tower defining a separating chamber of a substantially circular cross section therein, gas inlet means provided at the upper portion of the separating chamber for introducing gaseous fluid having particles suspended therein into said separating chamber with a tangential velocity component, outlet pipe means provided co-axially with the separating chamber at the upper portion thereof to allow the gaseous fluid to flow out of the separating chamber, said separating tower including a bottom portion of relatively substantially reduced height which is slightly inclined with respect to a horizontal plane to provide a lowermost bottom in the bottom portion, means for supporting said bottom portion on the separating tower, outlet port means in the lowermost bottom, vibrating means for applying vibration substantially only to said bottom portion of said separating tower and operatively engaged with said bottom portion, and flexible connecting means for connecting said bottom portion of said separating tower with said upper portion and dampening the vibration applied to said bottom portion of said separating tower so that there is substantially no vibration to said upper portion.

2. A cyclone separator in accordance with claim 1 in which baffle plate means is provided in said separating chamber above and spaced from the outlet port means.

3. A cyclone separator in accordance with claim 2 in which said baffle plate means is of an inverted conical configuration.

4. A cyclone separator in accordance with claim 4 in which said outlet pipe means includes at least two co-axial outlet pipes with an annular space therebetween, means being provided for directing air into said annular space downwardly toward the separating chamber.

5. A cyclone separator in accordance with claim 4 in which means is provided in said annular space for imparting spiral movement to the air flowing in said annular space.

6. A cyclone separator in accordance with claim 4 in which said gas inlet means is provided with accelerating air supply means for supplying air in the direction of gaseous flow in the inlet means.

* * * * *